United States Patent

Redlin et al.

[11] Patent Number: 5,951,680
[45] Date of Patent: Sep. 14, 1999

[54] CONFIGURATOR OBJECT

[75] Inventors: Charlie James Redlin; Paula Jean Rutherford, both of Rochester, Minn.

[73] Assignee: International Business Machines Corporation, Armonk, N.Y.

[21] Appl. No.: 08/881,479

[22] Filed: Jun. 24, 1997

[51] Int. Cl.[6] .................................................. G06F 17/30
[52] U.S. Cl. ............................................... 713/1; 709/303
[58] Field of Search ................................. 395/651, 701, 395/652, 162, 683, 703, 702, 705

[56] References Cited

U.S. PATENT DOCUMENTS

| | | | |
|---|---|---|---|
| 5,471,675 | 11/1995 | Zias | 395/162 |
| 5,475,817 | 12/1995 | Waldo et al. | 395/650 |
| 5,613,122 | 3/1997 | Burnard et al. | 395/701 |
| 5,652,884 | 7/1997 | Palevich | 395/651 |

*Primary Examiner*—Hassan Kizou
*Assistant Examiner*—Omar A. Omar
*Attorney, Agent, or Firm*—Schmeiser, Olsen & Watts

[57] ABSTRACT

New objects in an object-oriented environment are configured and initialized for a specific container location using a configurator object. Each container in the system will have a configurator object associated with the container. The configurator object for each container will contain the configuration attributes for their respective container. The configurator object will use the container attributes for the container where the newly created object is to be stored and will apply that container's attributes to the newly created object.

22 Claims, 6 Drawing Sheets

CONFIGURATOR OBJECT

BACKGROUND OF THE INVENTION

1. Technical Field

This invention generally relates to object-oriented programming and more specifically relates to an object-creation mechanism in object-oriented environments.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software programs designed for these high performance systems have become more powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects, a more stable, uniform, and consistent approach to developing new computer programs can be achieved.

Typically, object-oriented software programs or processes create and use objects to accomplish the required or desired goals of the application software. Most software processes will create an object or group of objects and then use those objects during the lifetime of that particular process. The objects that accomplish the software processes typically interact with other objects as part of the process. For example, a "client object" is an object that will request a certain service from another object, known as a "server object." The server object will receive the request from the client object and take appropriate steps to fill the client object's request.

While the introduction and implementation of object-oriented programming concepts has been beneficial, the use of object-oriented concepts is not without certain limits and, occasionally, undesirable side effects. For example, whenever a new object is to be created, the various configuration or initialization elements or attributes for the new object must be determined and set, typically according to the memory management requirement of the memory location where the new object is to be stored. Each memory management unit or storage area, known as a "container," will generally have a unique set of requirements for the objects that are to be stored in that container.

Since each new object is created by another, existing object, typically known as a "factory" object, the factory object must constantly be aware of the object configuration and initialization requirements for all possible types of objects that can be stored in a given container. If a number of objects with different configuration and initialization requirements are to be created in sequence, the process of verifying the configuration of the underlying attributes for a container for each of the objects can consume a significant amount of time. In addition, the factory object itself may need to be reconfigured to support each new container configuration requirement as new configuration requirements are developed. This means that every time a new type of container is created or configured, or if the attributes for an existing container are modified, then the factory object must be updated to reflect this change. This continual updating and reconfiguring of the factory object to support constantly changing container memory storage requirements is time-consuming and, if not done correctly, can possibly lead to incompatibilities and system-level errors.

Without a mechanism for more easily and flexibly configuring objects in object-oriented computer systems, users will be forced to accept an unnecessary amount of overhead when configuring and using new objects and containers in an object-oriented environment. Therefore, what is needed is an improved mechanism for configuring new objects in an object-oriented programming environment that can reduce the existing system overhead, increase reliability, and eliminate the possibility for configuration error that presently reduces efficiency and ease-of-use in object-oriented computer systems.

DISCLOSURE OF INVENTION

According to a preferred embodiment of the present invention, new objects in an object-oriented environment are configured and initialized for a specific container using a "configurator object." Each container in the system will have a configurator object associated with the container. The configurator object for each container will contain the configuration attributes for their respective container. New object creation is controlled by a "home object" (factory object) which is capable of creating the managed object assembly for new objects. The home object works with the configurator object for the container where the new object is to be stored and allows the configurator object to initialize the container-specific portions of the mixin object. The configurator object will use the container attributes for the container where the managed object assembly is to be stored and will apply that container's attributes to the mixin object. By delegating the container-specific initialization and configuration duties for mixin objects to the configurator object, the home object is isolated from the specific initialization details for individual containers and, therefore, need not be updated to reflect any changes in the initialization requirements for a given container. Since every container has a different configurator object associated with it, all container-specific configuration requirements can be embodied in the configurator object for that container. Additionally, if the configuration requirements for a given container are modified, only the configurator object for that container need be modified.

BRIEF DESCRIPTION OF THE DRAWINGS

The preferred embodiments of the present invention will hereinafter be described in conjunction with the appended drawings, where like designations denote like elements, and.

BEST MODE FOR CARRYING OUT THE INVENTION

The present invention relates to object-oriented programming techniques. For those individuals who are not generally familiar with object-oriented programming, the Overview section below presents many of the concepts and terminology that will help to understand the invention. Individuals skilled in the art of object-oriented programming and the associated technology may wish to skip the Overview section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

Another central concept in object-oriented programming is the "class." A class is a template or prototype that defines a type of object. A class outlines the makeup of objects that belong to that class. By defining a class, objects can be created that belong to the class without having to rewrite the entire definition for each new object as it is created. This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming to one degree or another.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below and other conventions will be explained as needed.

Definition of Terms

Certain terms will be explained below so that the use of these terms within this specification will be more clearly understood.

Container. A container is system-level memory management unit that holds server objects for use by client objects at run-time. Typically, each container includes a cache table or reference table which is a list of all of the objects being managed by the container at any given time. In addition, the container manages the objects in the container and moves objects in and out of memory. Containers are configured for the various types of objects that may be placed in the container at run-time and all of the objects that are placed in a given container have some common behavior, defined by the attributes of the container.

A container is usually implemented as an object that resides on a server. Typically, at least one container will be initialized to manage transient objects and a separate container will be initialized to manage persistent objects. Container variables such as cache size, termination policy for objects within the container, and how objects are involved with the transaction service are all configured at start time. Termination policy is a system-level management concept that allows certain objects an opportunity to update any state data that has changed in relation to the object prior to passivation of the object.

Home Object. The home object is a factory object that is an integral part of the client object interface and includes the methods necessary to allow other objects to create new objects and access the container through the client interface. The home object instantiates new objects in a generic sense. Client objects call methods on the home object and the home object interacts with container objects to create and manage objects. In accordance with a preferred embodiment of the present invention, one of the methods used to create new objects is the createFromPrimaryKeyString( ) method. The createFromPrimaryKeyString( ) method creates a managed object assembly in a container and can also create a persistent storage area for use with an object. Additionally, the home object according to a preferred embodiment of the present invention will also use the findByPrimaryKeyString( ) method to locate an existing object in a container or recreate an object that has been passivated or previously removed from memory.

Instance Manager. An instance manger is a framework that works within the server process and provides coordinated access to databases and other system resources. In addition, the instance manager performs memory management for objects at run-time.

2. Detailed Description

According to a preferred embodiment of the present invention, a configurator object is used to initialize the container-specific attributes of managed object assemblies. The configurator object initializes a mix-in object for the managed object assembly that will have the appropriate variables initialized so that the managed object assembly can be stored in the appropriate container. Each container will have a configurator object that will provide the initialization parameters for all objects stored in that container.

Since every container has a different configurator object associated with it, all container-specific configuration requirements can be embodied in the configurator object for that container. Additionally, if the configuration requirements for a given container are modified, only the configurator object for that container need be modified and all objects that are subsequently created for that container will be initialized with the correct memory management attributes.

Figure 1:
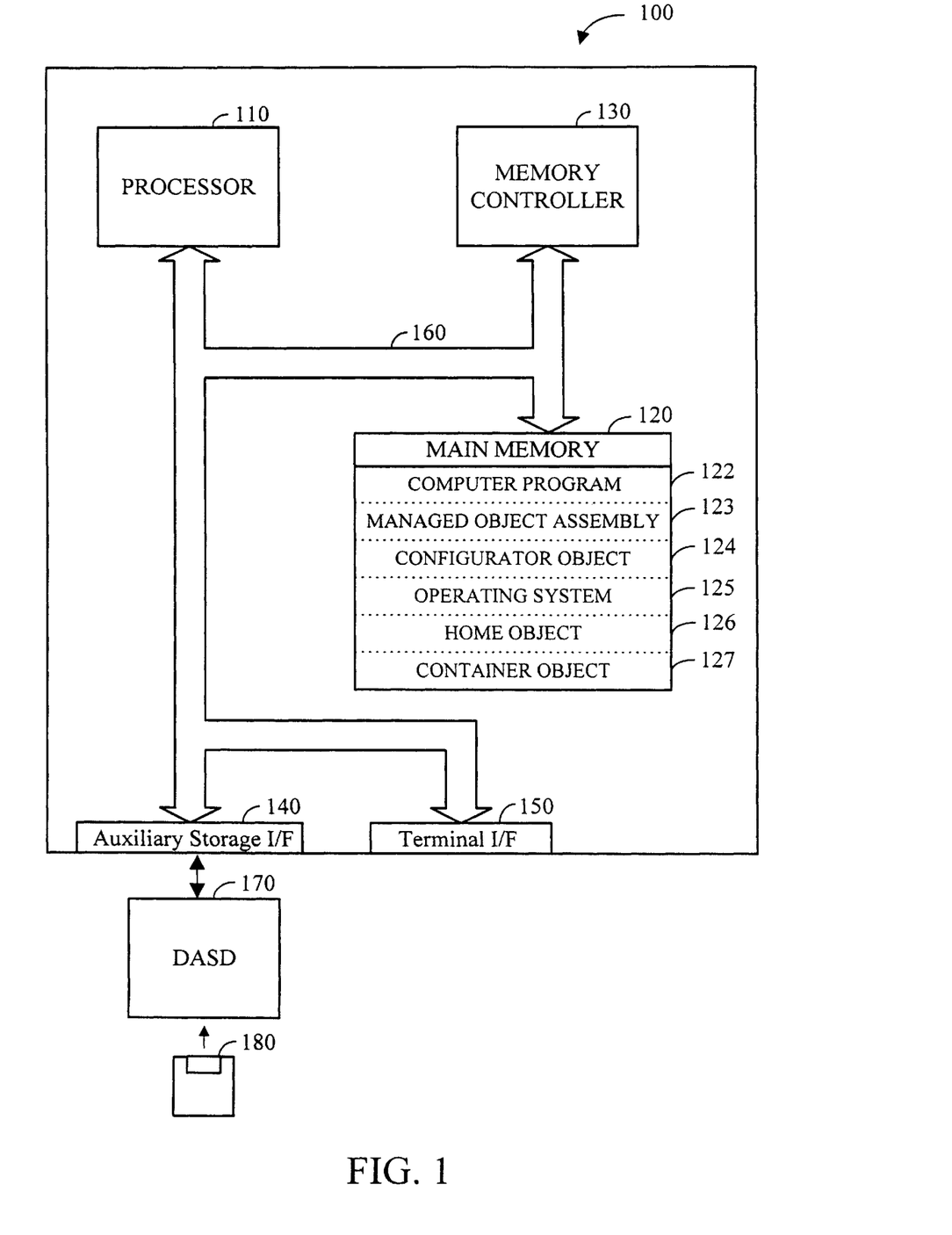
FIG. 1 is a block diagram of an apparatus according to a preferred embodiment of the present invention.

Referring now to FIG. 1, a computer system 100 in accordance with a preferred embodiment of the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, a managed object assembly (MOA) 123, a configurator object 124, an operating system 125, a home object 126, and a container object 127. Computer program 122 in memory 120 is used in its broadest sense, and includes any and all forms of computer programs, including source code, intermediate code, machine code, and any other representation of a computer program. Objects 123, 124 and 126 are created and/or manipulated by some portion of computer program 122. The term "memory" as used herein refers to any storage location in the virtual memory space of system 100.

It should be understood that main memory 120 will not necessarily contain all parts of all mechanisms shown. For example, portions of computer program 122 and operating system 125 may be loaded into an instruction cache (not shown) for processor 110 to execute, while other files may well be stored on magnetic or optical disk storage devices (not shown). In addition, although computer program 122 is shown to reside in the same memory location as operating system 125, and objects 123 and 124, it is to be understood that main memory 120 may consist of disparate memory locations.

Figure 2:
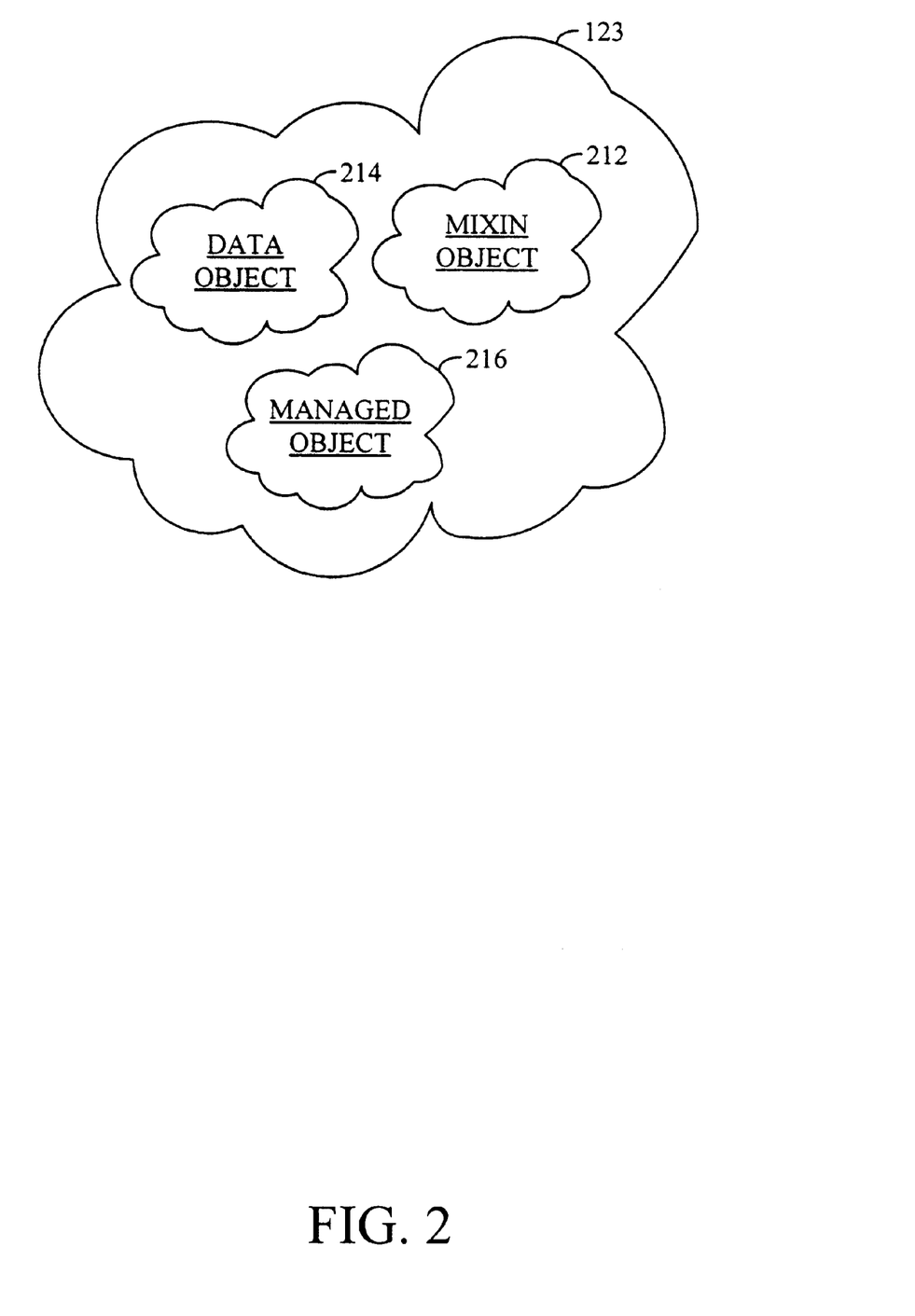
FIG. 2 is an object diagram of a managed object assembly according to a preferred embodiment of the present invention.

Referring now to FIGS. 1 and 2, a managed object assembly (MOA) 123 according to a preferred embodiment of the present invention includes: a mixin object (MIXIN) 212; a data object (DO) 214; and a managed object (MO) 216. Mixin object 212 is the part of managed object assembly 123 which is created and initialized by configurator object 124 and includes the attributes for storage in a given container. Data object 214 is one component of MOA 123. Data object 214 encapsulates information about the persistence characteristics of MOA 123 and may also store data values. One example of data object 214 is an object that contains Structured Query Language (SQL) statements for retrieving specific data from a database. Managed object 216 is also a component of MOA 123. Managed object 216 stores logic related to the functional aspects of MOA 123. For example, managed object 216 for an insurance policy will have a method that computes the expiration date of the insurance policy.

Figure 3:
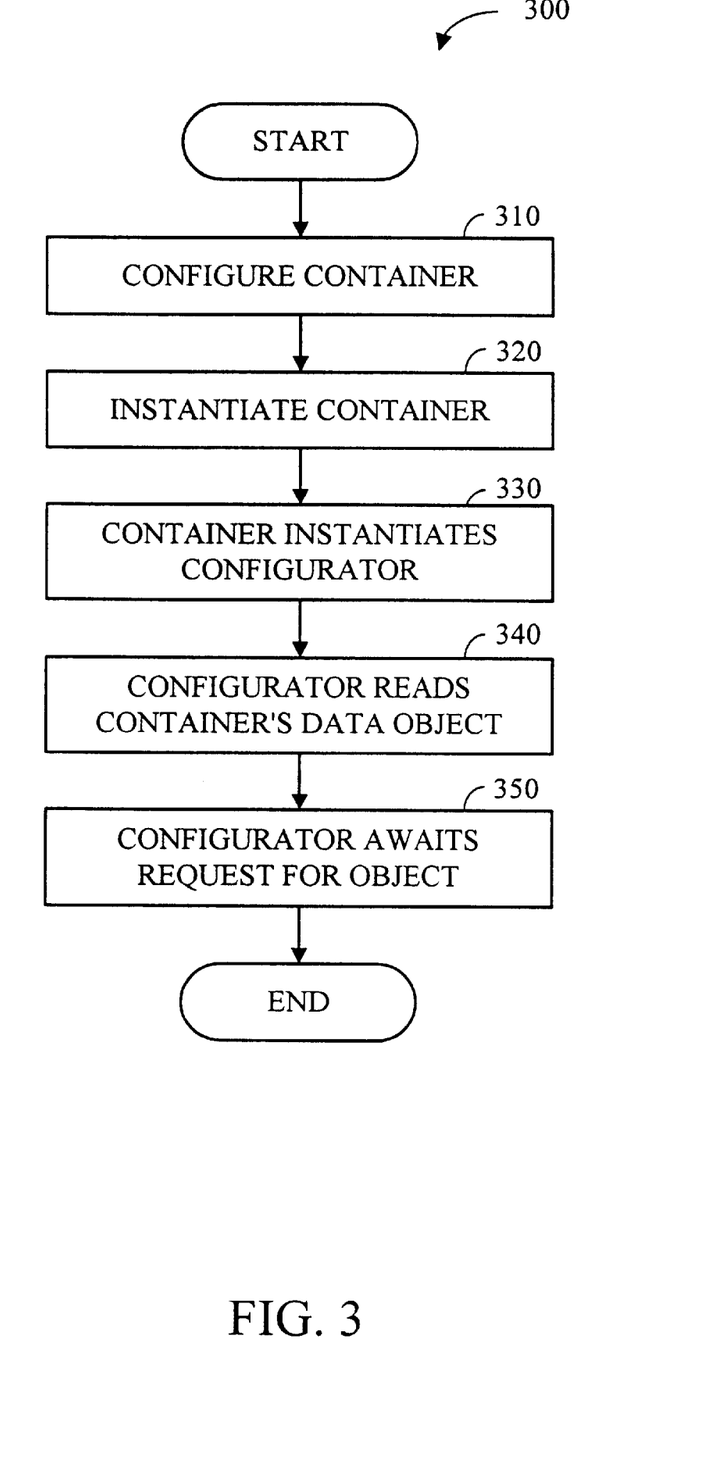
FIG. 3 is a flow diagram of a container configuration method according to a preferred embodiment of the present invention.

Referring now to FIGS. 1, 2, and 3, a method for creating new containers 127 according to a preferred embodiment of the present invention is illustrated. Whenever a new container 127 is to be created, the attributes and parameters for container 127 are defined (step 310). These attributes and parameters will include memory management attributes for objects to be stored in container 127. After the attributes and parameters have been defined, a new object container 127 is instantiated (step 320). It should be noted that container 127 is also a managed object assembly 123 and, as such, it has a data object 214. Container 127's data object 214 will contain the attributes and characteristics that define the configuration requirements for any objects to be stored in container 127.

Next, container 127 will instantiate a configurator object 124 (step 330). The newly created configurator object 124 is unique to container 127 and it will be used to configure the mixin object 212 for any new managed object assemblies 123 that are to be stored in container 127. Each configurator object 124 is associated with a given container and uses a subset of the configuration values contained in the container's data object 214 to determine the mixin values for managed object assemblies 123 to be stored in that container. Configurator object 124 will obtain the relevant configuration values by reading the container's data object 214 (step 340). In alternative preferred embodiments of the present invention, configurator object 124 may store the configuration information internally, cache the configuration information for later use, or simply read the configuration information from the container's data object 214 every time a new managed object assembly 123 is to be created.

Figure 4:
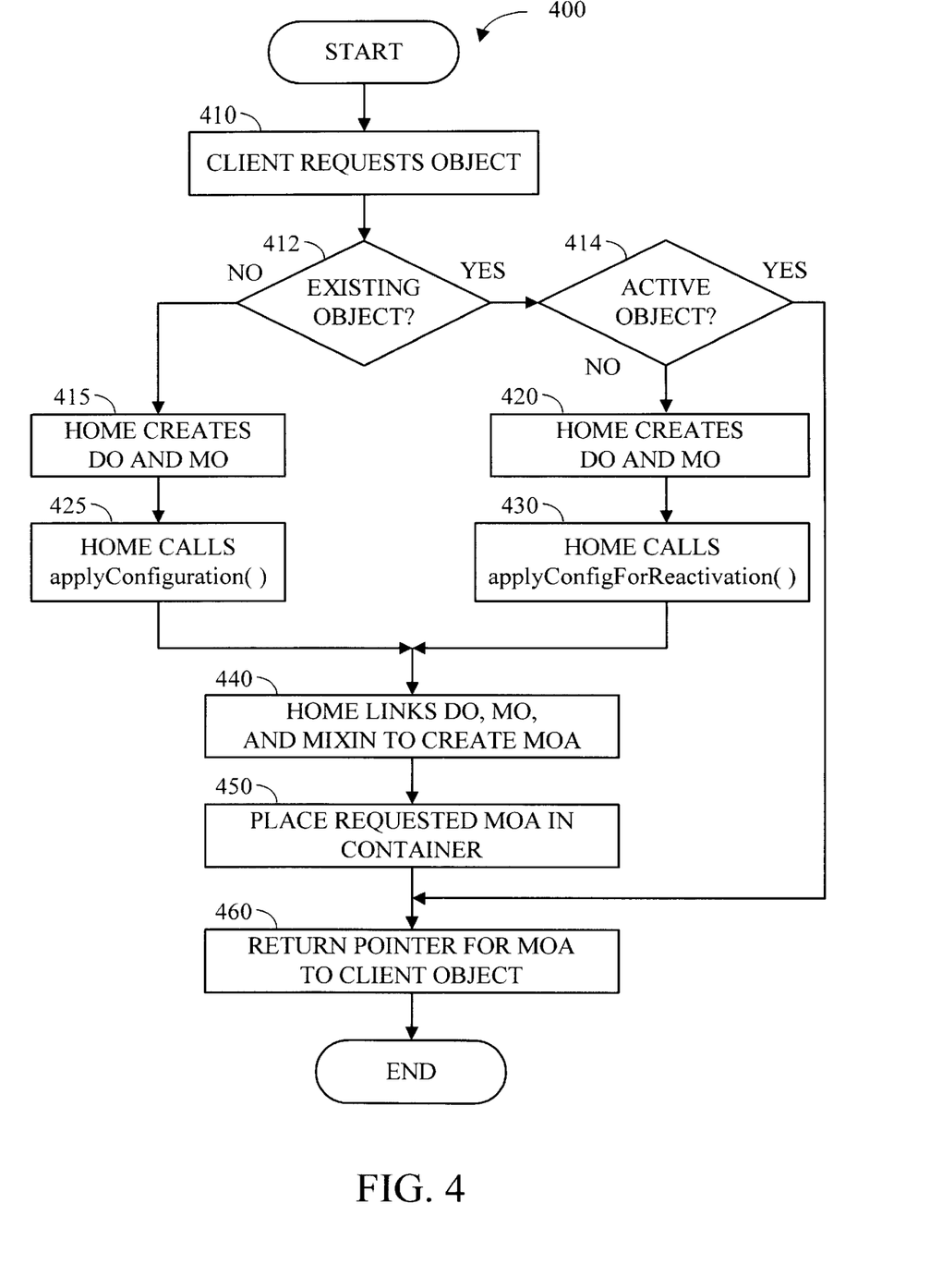
FIG. 4 is a flow diagram of an object configuration method according to a preferred embodiment of the present invention.

Referring now to FIGS. 1 and 4, a method 400 for providing methods for locating and configuring managed object assemblies 124 according to a preferred embodiment of the present invention is illustrated. In this method, a client object requests access to managed object assembly 123 by providing home object 126 with a reference to managed object assembly 123. It is important to note that the client object is unaware of the status or location of managed object assembly 123, it merely passes on the request for managed object assembly 123 to home object 126 and asks home object 126 to resolve the reference (step 410).

Before home object 126 can return a pointer to managed object assembly 123 for use by the client object, home object 126 must determine whether or not managed object assembly 123 is an existing object (step 412) and whether or not managed object assembly 123 is active in main memory 120 (step 414). If home object 126 determines that managed object assembly 123 is an existing object (step 412=yes) and that managed object assembly 123 is active main memory 120 (step 414=yes), then home object 126 will simply return a pointer to managed object assembly 123 for use by the requesting client object (step 460).

If, however, home object 126 determines that the requested object is not an existing object (step 412=no), home object 126 will create the requested managed object assembly 123 for the client object. The steps necessary to create managed object assembly 123 are accomplished by the createFromPrimaryKeyString( ) method. Whenever the createFromPrimaryKeyString( ) method is called on home object 126, home object 126 will create a data object 214 and a managed object 216 for a new managed object assembly 123 (step 415). After these two components have been created, home object 126 will call the applyConfiguration( ) method on configurator object 124. This method, shown in more detail in FIG. 5, directs configurator object 124 to create and configure mixin object 212 for managed object assembly 123. Configurator object 124 uses the configuration values of the container location where the new object is to be stored to provide the necessary values for mixin object 212.

As explained above, the configuration values for container 127 are a subset of the contents of container 127's data object 214 and provide different types of information for the mixin objects 212 that are created and stored in container 127. Since each container may have different interface requirements and access capabilities, the objects to be stored in the container must have the correct configuration values. In this capacity, configurator object 124 acts as a "factory" to provide the appropriate configuration and initialization values for mixin object 212 component of each new managed object assembly 123 as they are created. The various methods associated with container 127 are used by configurator object 124 primarily to determine the data storage behavior, including caching techniques, for newly created managed object assemblies 123. Configurator object 124 will then return a pointer for mixin object 212 to home object 126. Home object 126 will then link the three components together to create managed object assembly 123 (step 440), place requested managed object assembly 123 in container 127 (step 450) and return a pointer for managed object assembly 123 to the client object (step 460). Each container 127 may have multiple home objects 126 which are used to create various objects to be stored in container 127. Regardless of the number of home objects 126 that exist for a given container 127, all home objects for a given container 127 will use the same configurator object 124. Configurator object 124 will read the configuration information from container 127's data object and use the configuration information to correctly configure the mixin object for the managed object assemblies 123.

The specific container data object methods that are used by configurator object 124 whenever a new object is to be created and initialized include the following: memoryManagementPolicy( ) method; defaultTransactionPolicy( ) method; dataCachedInManagedObject( ) method; dataCachedInDataObject( ) method; and useCachingService( ) method. The memoryManagementPolicy( ) method provides memory management for new managed object assemblies 123 as they are created. Specifically, this method will determine whether managed object assembly 123 will be passivated or removed from memory at the end of any transaction which involves managed object assembly 123. The defaultTransactionPolicy( ) method provides the basic behavior managed object assembly 123 and can be used to set or determine the default behavior for managed object assembly 123. The dataCachedInManagedObject( ) method and the dataCachedInDataObject( ) method determine which specific data caching techniques and methods will be used by managed object assembly 123. Finally, the useCachingService( ) method determines whether or not the caching service for container 127 will be utilized by managed object assembly 123. By passing the appropriate parameters into these methods, managed object assembly 123 will be initialized with the necessary configuration information.

If the requested managed object assembly 123 is an existing object (i.e., persistent) that has been passivated or removed from memory, then home object 126 must recreate or reactivate managed object assembly 123 for access by the client object. In this case, home object 126 will create data object 214 and managed object 216 from information stored in secondary memory (step 420). Then, home object 126 will call the configuration( ) method on container 127. Container object 127, in turn, will forward the method call and call the applyConfigForReactivation( ) method on configurator object 124 (step 430). This method, shown in more detail in FIG. 6, directs configurator object 124 to create and configure mixin object 212 for the requested managed object assembly 123. Configurator object 124 uses the configuration values for container 127 where the requested object is to be stored to provide the necessary values for mixin object 212. As explained above, configurator object 124 will then return a pointer for mixin object 212 to home object 126. Again, home object 126 will link the three components together to create managed object assembly 123 (step 440), place requested managed object assembly 123 in container 127 (step 450) and return a pointer for managed object assembly 123 to the client object (step 460).

Figure 5:
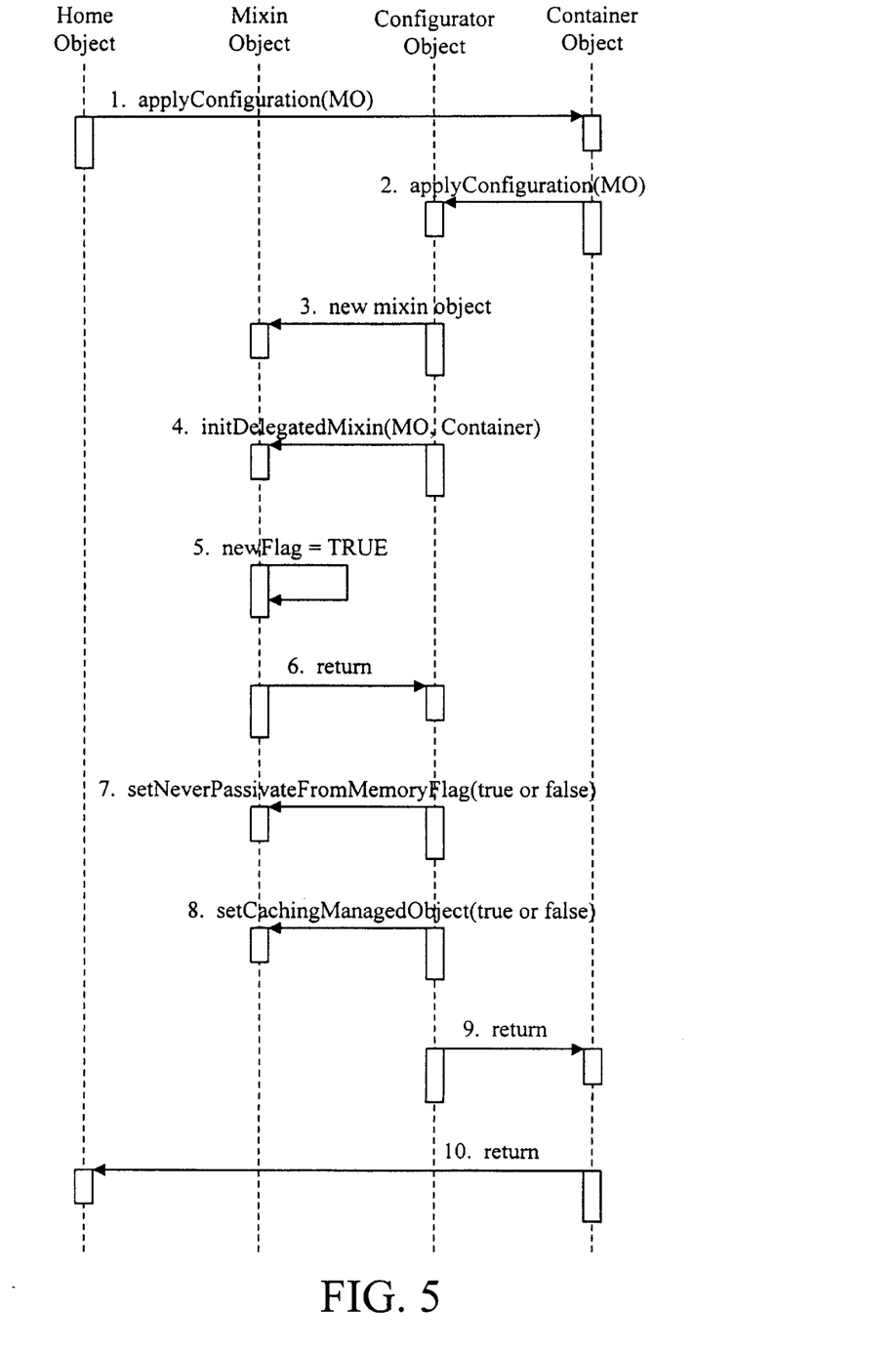
FIG. 5 is an object interaction diagram of a configuration method according to a preferred embodiment of the present invention.

Referring now to FIG. 5, an object interaction diagram of a configuration method according to a preferred embodiment of the present invention is shown. FIG. 5 outlines the steps necessary to create a new managed object assembly. When a new managed object assembly is to be created, home object 126 calls the applyConfiguration( ) method on container object 127, using the desired managed object 216 as the parameter (step 1). Container object 127, in turn, forwards or delegates the method call to configurator object 124 (step 2). Configurator object 124 instantiates a mixin object 212 of the desired class as determined by a combination of configuration values for container object 127. Configurator 124 uses the defaultTransactionPolicy( ) method to determine the class type for mixin object 212. "New" is a C++ operator used to create the mixin object (step 3).

After creation, mixin object 212 is initialized by calling the initDelegatedMixin( ) method on newly created mixin object 212 (step 4). Mixin object 212 will then set a flag to indicate that this is a newly created object (step 5). After completing these tasks, mixin object 212 returns control to configurator object 124. Configurator object 124 will then set a memory management attribute flag for mixin object 212 by calling the neverPassivateFromMemory( ) method on mixin object 212. By setting the value of the flag to true or false, the passivation characteristics for mixin object 212 can be controlled. Configurator object 124 will then set another memory management attribute flag for mixin object 212 by calling the setCachingManagedObject( ) method on mixin object 212. By setting the value of the flag to true or false, the caching characteristics for mixin object 212 can be controlled.

Figure 6:
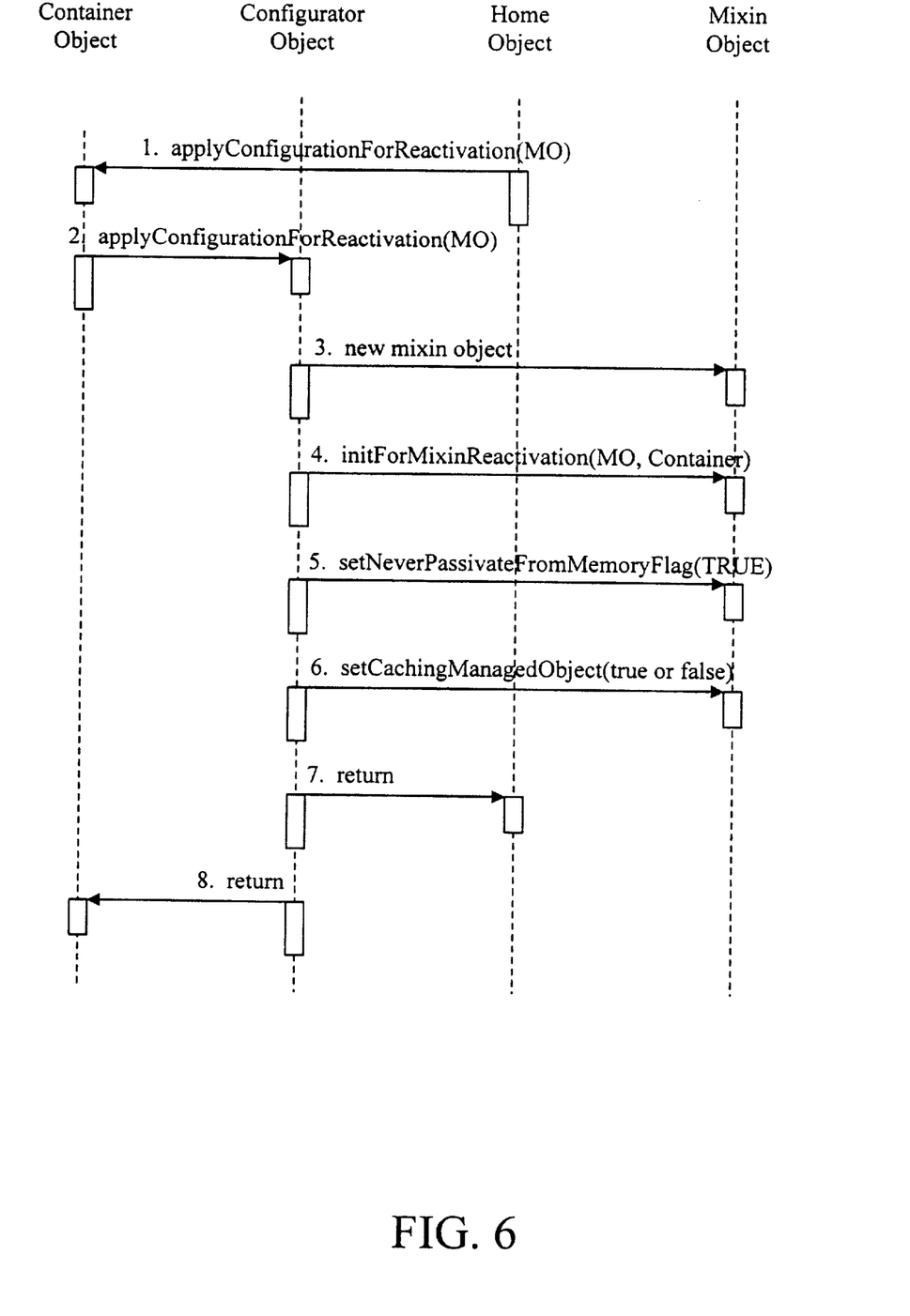
FIG. 6 is an object interaction diagram of an alternative configuration method according to a preferred embodiment of the present invention.

Referring now to FIG. 6, an object interaction diagram of a configuration method according to a preferred embodiment of the present invention is shown. The steps in FIG. 6 are basically the same as explained above in conjunction with FIG. 5 and are used to reactivate a managed object assembly that has been passivated or removed from memory. Although the steps are similar, since managed object assembly 123 has previously been created, newFlag is not set. In addition, the initForMixinReactivation( ) method is used instead of the initDelegatedMixin( ) method.

It is important to note that by implementing a preferred embodiment of the present invention, the configuration values for a given container can be changed and configurator object 124 will automatically use those values to create and correctly configure any new objects that are to be stored in that container. Since the container-specific configuration details are abstracted away from home object 126, there is no need to update home object 126 when container-specific details are modified.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

We claim:

1. An apparatus, the apparatus comprising:
    a processor coupled to a bus;
    a memory coupled to the bus;
    a container object residing in the memory;
    a configurator object residing in the memory, the configurator object obtaining at least one configuration attribute from the container object;
    a managed object assembly residing in the memory; and
        wherein the configurator object configures a portion of the managed object assembly for use with the container object by using the at least one configuration attribute.

2. The apparatus of claim 1, wherein the managed object assembly comprises a data object, a managed object, and a mixin object.

3. The apparatus of claim 1, wherein the at least one configuration attribute is a memory management attribute.

4. The apparatus of claim 3, wherein the memory management attribute is a variable related to memory caching.

5. The apparatus of claim 3, wherein the memory management attribute is a variable related to passivation of the managed object assembly.

6. A method of configuring a managed object assembly, the method comprising the steps of:

creating a configurator object for a container, the container having at least one configuration attribute; and using the configurator object to configure a portion of the managed object assembly using the at least one container configuration attribute.

7. The method of claim 6, wherein the portion of the managed object assembly comprises a mixin object and the step of configuring the managed object assembly further comprises the step of configuring the mixin object.

8. The method of claim 7, wherein the step of configuring the mixin object comprises further comprises the step of configuring a memory management attribute for the mixin object.

9. The method of claim 8, wherein the memory management attribute is a variable related to memory caching for the managed object assembly.

10. The method of claim 8, wherein the memory management attribute is a variable related to passivation of the managed object assembly.

11. A method of initializing a managed object assembly, the method comprising the steps of:

creating a configurator object for a container, the container having at least one configuration attribute;

creating the managed object assembly;

using the configurator object to initialize the managed object assembly for use with the container by configuring the managed object assembly with the at least one configuration attribute.

12. The method of claim 11, wherein the managed object assembly further comprises a mixin object and the step of initializing the managed object assembly with the at least one configuration attribute further comprises the step of configuring the mixin object.

13. The method of claim 11, wherein the step of configuring the mixin object further comprises the step of configuring a memory management attribute for the mixin object.

14. The method of claim 13, wherein the memory management attribute is a variable related to memory caching for the managed object assembly.

15. The method of claim 13, wherein the memory management attribute is a variable related to passivation of the managed object assembly.

16. A program product comprising:

(A) a configurator object, the configurator object configuring a managed object assembly for use within a container by initializing at least one memory management attribute to match at least one container attribute;

(B) signal bearing media bearing the configurator object.

17. The program product of claim 16 wherein the signal bearing media comprises recordable media.

18. The program product of claim 16 wherein the signal bearing media comprises transmission media.

19. The program product of claim 16, wherein the at least one memory management attribute is a variable related to memory caching for the managed object assembly.

20. The program product of claim 16, wherein the at least one memory management attribute is a variable related to passivation of the managed object assembly.

21. A computer-implemented method for configuring a managed object assembly, the method including the steps of:

creating a configurator object for a container, the container having at least one configuration attribute;

creating the managed object assembly;

using the configurator object to initialize the managed object assembly for use with the container by configuring the managed object assembly with the at least one configuration attribute.

22. The computer-implemented method of claim 21 wherein the managed object assembly further comprises a mixin object and the step of initializing the managed object assembly with the at least one configuration attribute further comprises the step of configuring the mixin object with the at least one configuration attribute.

* * * * *